Patented Oct. 25, 1949

2,486,012

UNITED STATES PATENT OFFICE 2,486,012

COMPOSITIONS OF CHLORINATED TERPHENYL AND CELLULOSE ACETATE-BUTYRATE FOR STRIPPABLE COATINGS

Robert Ernst, Los Angeles, Calif.

No Drawing. Application October 5, 1946,
Serial No. 701,415

13 Claims. (Cl. 106—190)

This invention relates to the art of coating objects and to synthetic organic compositions suitable for such coatings. This application is a continuation-in-part of Serial 595,893 (abandoned).

This inventon relates to thermoplastic coatings and coating compositions and also to such coating compositions which are strippable. The coatings formed by employing the compositions of my invention are smooth, transparent, and non-blushing so that their light-transmitting characteristics are not impaired with age. The coatings are not tacky. Objects coated with this material will not adhere to each other when stacked. The coatings are tough so that they will not be easily cut by sharp edges or points which are coated with these compositions. The coatings have a high tensile strength and are flexible over a considerable temperature range and even at very low temperature. They have a high yield point, so that they are resistant to plastic deformation even under considerable load. They can be slit by a very blunt as well as a sharp tool. They are non-adherent to coated surfaces so that they may be easily stripped from the surfaces. They exhibit considerable elongation before tearing so that they may be easily stripped in one unit from the coated part. The coating does not contain constituents which are volatile at the highest temperature encountered under storage conditions in the hottest climates and thus are stable and will not deteriorate in storage.

Because of these characteristics, objects may be readily coated with thick transparent strippable coatings which will not crack or check at low temperature or become unduly soft at high atmospheric temperatures, and thus are stable at all attainable atmospheric temperatures from the lowest arctic to the highest torrid zone temperatures. Objects coated with such coatings will not adhere to each other when stacked or packed even when the pressures of the objects against each other, resulting either from static loads or from the weight of the superposed objects or from packaging or dynamic loads, are high. The coatings will also not show any plastic deformation or other deformation such as cutting or nicking or other surface conditions.

The objects will thus be protected from corrosion or other spoilage over prolonged periods of time. The coatings may be readily removed by stripping, since they are substantially non-adherent.

These coating materials have a sufficiently low melting point and sufficiently large viscosity temperature coefficient so that at temperatures well below their oxidation or decomposition point they are very fluid. They contain no materials which are volatile at these temperatures. As a result these materials may be held at a temperature suitable for coating for prolonged periods without any substantial alteration in the properties of the material.

The materials also have a relatively short temperature range between their softening and melting points and high viscosity when in this range. As a result of this high viscosity temperature coefficient, whereby the viscosity increases rapidly with fall in temperature, and the short temperature range between the softening point and melting points, objects dipped in the fluid composition become coated with a relatively thick coating when dipped, which coating sets rapidly with but a small run-off.

I have found that in order to form such films, I may successfully employ cellulose esters of the lower fatty acids, particularly the mixed esters, such as the cellulose acetate butyrate esters.

This composition may be plasticized by suitable compatible plasticizers, such as esters of phthalic acid and sebacic acid, etc., hydrogenated methyl abietate, or other well known compatible plasticizers which heretofore have been used in plasticizing such esters and have sufficiently low vapor pressures to resist evaporation. Waxes may be added to the mixture to further reduce the water-adsorbing and transmitting characteristics of the esters.

While such compositions have relatively good film-forming characteristics and will result in strippable coatings on metallic objects which are dipped into the molten composition, they have a large spread between their softening and melting points. As a result, they drain and run off until they attain a relatively low temperature and will not give the desirable coatings produced by the compositions of my invention. The coatings are also too soft at atmospheric temperatures and especially at elevated atmospheric temperatures and are of relatively low tensile strength, poor impact resistance, abrasion resistance, and tear readily. The coating deforms at elevated temperatures and gives rise to cutting through due to the poor plasticity value.

I have found that I may materially improve these compositions and attain the desirable coatings produced by my invention by incorporating in such plasticized film-former a compatible solvent for the film-former. I have discovered that in order to obtain a superior coating such solvent should have the following characteristics:

It should preferably be solid at the highest atmospheric or storage temperature to be encountered by the coating, for example, it should have a melting point in excess of about 150° F. It should be a solvent for the film-former when in molten condition. It should be compatible therewith in the proportions employed in that it will not, when cooled, separate out in a separate phase. Should it do so the composition is said to blush; it may be opalescent, or even opaque, or give nacreous effects, will tend to be brittle, and will not have the properties herein described as desirable.

The solvent should itself be thermoplastic and non-volatile on repeated melting or prolonged heating at the temperatures at which the dipping operation is carried out. It should be inherently non-corrosive to metals and sufficiently stable so that it will not be oxidized by air or otherwise decomposed by atmospheric temperature, light, and moisture. It must also be water resistant and therefore not soluble in or attacked by water, and show low water adsorptive properties.

I have found that the chlorinated terphenyls (chlorinated phenyl biphenyls) or mixtures of chlorinated terphenyls and chlorinated diphenyls are particularly suitable. These are obtained by chlorination or terphenyls, including mixtures of isomeric terphenyls or mixtures of such terphenyls and diphenyls or by mixing separately chlorinated terphenyls and diphenyls. If the chlorination is of the terphenyls or of mixtures of terphenyls and diphenyls, the chlorination is carried to a degree to produce chlorinated product having a melting point of above about 150° F. and below about 450° F. If a mixture of chlorinated terphenyl compounds with chlorinated diphenyls is employed, the degree of chlorination of the diphenyl and terphenyl and their proportion are adjusted to give a material having a melting point above about 150° F. and below about 450° F. In most such cases the chlorinated polyphenyl compound is a mixture of chlorinated compounds and does not have a sharp melting point. It has a softening point and gets progressively softer until it is completely melted. The melting point therefore has a spread. It is desired that the chlorinated polyphenyl employed be completely melted when heated to a temperature at which the cellulose acetate butyrate employed is completely melted. As will be indicated below this is at a temperature less than about 450° F.

The following chlorinated terphenyls and mixtures of chlorinated terphenyls and chlorinated diphenyls of commercial grade are now commercially available.

*Nonochlorterphenyl (hereinafter referred to as terphenyl A)*

Form: Yellow transparent resin.
Color—NPA: 2.0 max.
Acidity—maximum (mgm. KOH per Bm.): 0.07.
Coefficient of expansion:
 Cc./cc. °C.—0.00179 (25°–124° C.).
 Cc./cc. °F.—0.000994 (77°–255° F.).
Density:
 Specific gr. 25°/25° C. (77°/77° F.)—1.740 to 1.745.
 Pounds per gal. —25° C. (77° F.)—14.50.
Distillation range—ASTM D-20 mod.:
 °C.—requires vacuum.
 °F.—requires vacuum.

Evaporation loss—per cent ASTM D-$t$ mod.:
 163° C., 5 hours.—0.025.
 100° C., 6 hours—1.51 to 1.71 (at 260° —5 hrs.).
Flash point—Cleveland open cup:
 °C.—none (not flashable).
 °F.—none.
Fire point—Cleveland open cup:
 °C.—none (non-flammable).
 °F.—none.
Softening point—ASTM E-28:
 °C.—100° to 105.5° C.
 °F.—212° to 222° F.
Refractive index—D-line 20° C.—1.660–1.665.

*Chlorinated isomeric terphenyls (having a carbon hydrogen and chlorine atomic ratio as follows: 18 carbon atoms and 2.5 hydrogen atoms to 11.5 chlorine atoms, which compound will hereinafter be referred to as terphenyl B)*

Form: Yellow, opaque, brittle resin. Can be pulverized.
Density: Approximately 15#/gal. (solid).
Distillation range: Requires vacuum —260° C.–350° C. at 3 mm. Hg.
Softening point: 120° C.–125° C.
Chlorine content: 64.0–65.5%.
Flash and fire point: None below 400° C.—will decompose if heated to higher temperatures.
Solubilities: Soluble to approximately 10% in good lacquer solvents.

*Mixture of 60% chlorinated diphenyl and 40% chlorinated terphenyls (hereinafter referred to as terphenyl C)*

Form: Yellow, transparent brittle.
Chlorine content: 64–65%.
Evaporation loss, per cent: ASTM D-6 modified at 100° C. (6 hrs.)—0.012.
Flash point (Cleveland): None (non-flashable).
Softening point: 151° F.

The melting point of these materials is about 10° C. above the softening point.

These materials are incompatible with cellulose acetate butyrate unless the butyryl value of the cellulose ester is in excess of about 38%.

Thus, for example, nonoclorterphenyl is incompatible with cellulose acetate butyrate of 38% or less butyryl value in the ratio of cellulose acetate butyrate to the chlorinated terphenyl of 20:1; 3:1; 2:1 or 1:1, while it is compatible with cellulose acetate butyrate of about 49% or more butyryl content in such ratios.

Incompatibility results in the production of opaque, brittle films which crack or check at low temperatures and are therefore not suitable for my purposes.

Cellulose acetate butyrate having a butyryl content of more than 35% also have the favorable melting point which makes them adaptable for use in forming the strippable films of my invention both when cast from solvent solutions as well as when employed by the hot dip method from melts without the use of "active" solvents.

Thus such cellulose acetate butyrate compositions have melting points below about 450° F.

Compositions which have a butyryl value of less than about 30% have melting points of 450° F. and higher and are not only incompatible with the chlorinated terphenyls as set forth above but have such high melting points that they cannot be conveniently melted nor give the films previously described. Cellulose acetate butyrates having a butyryl value in excess of 30% have appropriate melting points below 450° F., but if they have butyryl values of 38% or less they are incompatible with the chlorinated terphenyls, as described above, and are not adaptable to produce the films described above.

Thus, by employing the chlorinated terphenyls (i. e., chlorinated ortho, meta, or para phenyl biphenyl) or mixtures thereof or their mixtures with chlorinated diphenyl, chlorinated to a degree to give the desired melting point above about 150° F. and below about 450° F., I may obtain a composition of the properties set out above as desirable for forming hot melt coatings. Such compositions are also useful for forming strippable films in casting such films from active solvent solutions.

The chlorinated terphenyls employed are solids at ordinary temperatures, and while acting as a solvent for the cellulose esters they have no substantial plasticizing action upon the cellulose acetate butyrate. Thus, they do not soften the film or increase its elongation. Consequently the plasticizing action of the added plasticizers is not substantially modified by the inclusion of the chlorinated compound.

The film has substantially the same hardness and elongation with or without the chlorinated terphenyls. Since chlorinated terphenyls do not have a plasticizing action on the cellulose ester, ordinary plasticizers may be used in normal ratio to the cellulose acetate butyrate, or even greater amounts of the plasticizer may be employed in order to impart those characteristics as are usually obtained by the use of such plasticizers. The addition of the chlorinated terphenyls does not interfere with their use. This is in contradistinction to chlorinated diphenyls (chlorinated phenyl benzenes) which are liquid plasticizers for cellulose acetate butyrate. Thus, the chlorinated terphenyl, by a proper choice of the chlorinated terphenyl to obtain its desirable melting point, may be used to adjust the melting point and softening points of the coating or dipping formulations. I may thus lower the viscosity of the composition at dipping temperatures and lower the dipping temperature itself to produce coating of desirable thickness at temperatures sufficiently low to render the coating composition stable. I am thus able to eliminate undue evaporation of plasticizers and avoid inclusion of air pockets arising from an excessive viscosity of the composition.

The following experiments illustrate the effect of butyryl value of the cellulose acetate butyrate upon its melting point and its compatibility with chlorinated terphenyls, and also illustrate the effect of such compatibility or incompatibility upon the character of coatings formed either by the hot dip method or by casting from active solvents.

Type of cellulose acetate butyrate

| Sample | Acetyl Content | Butyryl Content | M. P. | Ratio of Cellulose Acetate Butyrate to Nonochlorterphenyl | | | |
|---|---|---|---|---|---|---|---|
| | | | | 4:1 | 3:1 | 2:1 | 1:1 |
| | Per cent | Per cent | °C. | | | | |
| 1 | 31.2 | 15.5 | 241–252 | I | I | I | I |
| 2 | 29.5 | 17 | 232–238 | I | I | I | I |
| 3 | 13.5 | 36.5 | 215–224 | I | I | I | I |
| 4 | 12–12.5 | 37.5–38.5 | 210–220 | I | I | I | I |
| 5 | 6.0 | 49.0 | 180–189 | C | C | C | C |

I—Incompatible. C—Compatible.

Sample 1, having a melting range of 241–252° C., and sample 2, having a melting range of 232–238° C., were too high in melting point to conduct practical hot melt experiments, but may be employed in forming films in casting from active solvents. Samples 3 to 5 were mixed with nonochlorterphenyl separately and with the plasticizers in accordance with the following formulations, heated and agitated in a convection oven at approximately 370° F.:

Formula 1

Per cent by weight
Cellulose acetate butyrate _____ 50
Nonochloroterphenyl _____ 25
Hydrogenated methyl abietate _____ 12.5
Dioctyl phthalate _____ 12.5

In each case the cellulose mixed ester (sample 5), having 6% acetyl and 49% butyryl value, produced clear melts, giving films on cooling of good strength and quality, clear, and of good tensile strength and flexibility, while the mixed ester (sample 3) formed clear melts, but turned opaque, weak, brittle on cooling, and gave castings or films which were opaque, weak, and brittle on cooling.

Cellulose acetate butyrate, such as identified as samples 1 to 5, above, may also be cast from a solvent solution as follows:

Formula 2

Per cent by weight
Cellulose acetate butyrate _____ 10
Nonochlorterphenyl _____ 3.3–10
Dibutyl phthalate _____ 4.0
Solvent was composed of:
  Acetone _____ 50
  Butyl acetate _____ 15
  Ethyl acetate _____ 15
  Diacetone alcohol _____ 14
  Toluol _____ 6

Solutions were cast on plate glass, air dried for two hours and force dried at 50° C. for two hours. Film was then inspected for resin blush. The films formed from the cellulose acetate, sample 5, were clear while those formed from esters, samples 1 to 4, were opaque, showing a definite resin blush. Like results were obtained when using the other terphenyls referred to above, i. e., terphenyl B and C.

Cellulose acetate butyrate having higher than 49% butyryl content will also show as good or better compatibility with the chlorinated terphenyl as is exhibited by the cellulose acetate butyrate of 49% butyryl value employed in these experiments.

The exact limit of butyryl content greater than 38% which may be employed will differ with different batches of cellulose acetate butyrate and their compatibility with the terphenyls may be readily determined by applying the above tests.

In formulating the coating compositions of my invention, I may employ different percentages, depending on the service for which it is desired:

Per cent by weight
Cellulose acetate
  butyrate _____ About 20 to about 60
Plasticizer _____ About 10 to about 50
Chlorinated terphenyls
  or mixtures of chlorinated terphenyl and
  chlorinated diphenyl __ About 10 to about 50

I have found that forming strippable coatings on metallic parts films of maximum flexibility and optimum properties, as described below, are obtained by employing the following range of percentages:

|  | Per cent |
|---|---|
| Cellulose acetate butyrate | About 30 to about 50 |
| Chlorinated terphenyl | About 25 to about 50 |
| Plasticizers | About 30 to about 50 |

These materials, of course, are used in proportions to make up 100%.

To this material I may add a small amount of wax, about 1 to 5%, and, if desired, an oxidation inhibitor.

In employing the above chlorinated terphenyls or mixtures thereof with chlorinated diphenyls in the above formulation of cellulose esters, plasticizers, waxes, and chlorinated compounds, the above range of percentage of the chlorinated compounds appears to be useful. If they are used in excess of about 60% of the total mix the films lose in strength and are unduly brittle at low temperature. The ratio of the cellulose acetate butyrate to chlorinated terphenyl depends on the final properties desired and may usefully vary from about 6:1 to about 1:3, depending on the percentage of plasticizer and the melting point of the cellulose acetate butyrate. If they are used in amount less than 15% of the total mix, the fluidity of the mix at temperatures of about 275° F. to 330° F. is reduced so that it is too thick for adequate dipping and coating.

The formulation when used in my hot dip coating method is preferably adjusted by adjusting the ratio of the plasticizer and chlorinated terphenyls or mixtures of chlorinated terphenyls and chlorinated diphenyls to obtain a composition which will be fluid and free-flowing at a temperature of about 230° F. to 350° F. and which will have a softening point above about 150° F. and will have a spread of from about 30° to about 75° F. between its softening point and melting point so as to give desirable coatings on metallic objects dipped in the molten composition which, depending on the temperature of dip, will range in thickness from about .03 to .15 inch.

A particularly useful composition for hot melt dip, clear strippable coating is as follows:

*Formula 3*

|  | Percent by weight |
|---|---|
| Cellulose acetate butyrate (49% butyryl and 6% acetyl slightly plasticized, composed of 100 parts cellulose acetate butyrate, 25.75 parts dibutyl sebacate, 17 parts of butyl stearate) | 49.8 |
| Nonochloroterphenyl | 28.9 |
| Dioctyl phthalate | 10.4 |
| Hydrogenated methyl abietate | 8.2 |
| Menthylphenol | .7 |
| Metaterphenyl | 2 |

In the following formulations I obtained clear melts which produced flexible coatings of excellent quality on congelation:

*Formula 4*

| | | | | |
|---|---|---|---|---|
| Cellulose acetate butyrate (50% butyryl content —6% acetyl content) | 50% | 30% | 60% | 30% |
| Nonochloroterphenyl (terphenyl) | 30% | 40% | 15% | 30% |
| Dioctyl phthalate | 10% | 15% | 12.5% | 20% |
| Methyl hydroabietate, i. e., hydrogenated methyl abietate | 10% | 15% | 12.5% | 20% |

*Formula 5*

|  | Per cent |
|---|---|
| Cellulose acetate butyrate (50% butyryl content —6% acetyl content | 50 |
| Terphenyl B | 25 |
| Dioctyl phthalate | 12.5 |
| Methyl hydroabietate i. e., hydrogenated methyl abietate | 12.5 |

*Formula 6*

|  | Per cent |
|---|---|
| Cellulose acetate butyrate (50% butyryl content —6% acetyl content | 50 |
| Terphenyl C | 25 |
| Dioctyl phthalate | 12.5 |
| Methyl hydroabietate i. e., hydrogenated methyl abietate | 12.5 |

The cellulose acetate butyrate employed above is unplasticized, pure ester. This composition has a melting point of 180–189° C.

Other compatible plasticizers may be used in place of the dioctyl phthalate and hydrogenated methylabietate. Such plasticizers have been previously employed for the plasticizing of cellulose esters.

For example, I may employ:

|  | Per cent |
|---|---|
| Cellulose acetate butyrate (50% butyryl content —6% acetyl content) | 40 |
| Nonochloroterphenyl | 25 |
| Tetrahydrofurfuryl oleate | 18 |
| Dioctyl phthalate | 14 |
| Menthyl phenols | 3 |

Again, castor oil may take the place of the tetrahydrofurfuryl oleate in the above formulation where it may be employed in approximately the same proportions. Equally, dioctyl phthalate may be replaced by dioctyl sebacate or butyl phthalyl butyl glycolate in about the same proportions.

Other waxes previously employed in plastic formulations for the purpose of reducing water absorption characteristics may be employed instead of metaterphenyl such as, for example, opal wax (hydrogenated castor oil). If the composition is throughly mixed small percentages of petroleum waxes may be employed. The chlorinated terphenyls in the above formulations reduce the water absorption properties of the cellulose acetate butyrate and, depending on the percentage of chlorinated terphenyls employed, either reduce the amount of wax needed to obtain any desired water resistance or make their use optional. Any well known anti-oxidant may be employed, for example, menthylphenol.

The properties of the film formed by Formula 3 are as follows:

It is free-flowing at temperatures above about 245° F.

A film of this plastic measuring 0.008″ in thickness and placed on a "Fisher-Jones" melting-point apparatus and tested by touch with a glass rod gives the following results:

| | |
|---|---|
| Softening point (88° C.) °F | 190 |
| Melting point (start of melting to full fluidity (110° C.–118° C.) | 230–245 |

Continued heating at this temperature will have no material effect on the compound.

A pellet of ½″ diameter and ½″ high, aged twenty-four hours at 160° F. and unler load of 11 pounds at 160° F. for five minutes will deflect only 20% and regain up to 99% of its original size after release of pressure.

Flash point of composition, 410° F. and fire point, 455° F., by Cleveland open cut test (ASTM D-92-33).

Less than .5% loss by volatilization in accordance with specification AN-C-117.

Films of 0.25" in width and 0.0305" in thickness show an average breaking strength of 465 pounds per square inch if tested on a "Schopper tensile tester" 5 kg. capacity, and exhibit over 100% average elongation.

The effect of the additives to the cellulose acetate butyrate will be apparent from the following data:

In employing the above material (Formula 3) for dip-coating of objects, the mixture is molten and is stirred to give a uniform solution. It may then be allowed to cool, whereupon it sets up. It may be cut into desirable shapes for shipping. When it is to be employed, it may be re-melted and heated to a temperature of 245° F. and higher. In dipping it is desirable not to heat the compound above about 375° F. and preferably not above about 330° F.

The object to be coated is then immersed in the molten compound and withdrawn to allow draining. The temperature of the molten coating compound will determine the thickness of the coat. Thus, depending somewhat upon the type of part being coated, employing the above formulation No. 3 at a dipping temperature of about 275° F., the coat will be about 0.1" in thickness, and at a temperature of 320° F., the coat will be about 0.04" in thickness.

The coat while not adhering to the surface coated will, however, set in close contact therewith. Thus, even curved surfaces of small radii or sharp corners, such as the base of threads or grooves and collars, etc., are filled in and completely coated by the composition. The composition follows the surface to be coated.

The coating deposited will be free of bubbles or blisters, transparent to the extent of permitting inspection and identification of part numbers and markings even after aging tests. It will be strippable in whole strips or in sheets before and after aging. It will protect the part against corrosion and mechanical damage due to abrasion or impact, even heavy parts or irregularly shaped parts.

The following data illustrates the efficiency of the coating as a corrosion protection:

Steel parts coated with the composition, the formulation of which is given above, exposed to 100% R. H. at from 100° F. to 120° F. for 720 hours, showed no corrosion after stripping.

Parts so coated and tested for 1000 hours in a 20% salt spray cabinet showed no corrosion after stripping, and were also resistant to the cycling test, consisting of exposure of coated objects to 16 hours at a temperature of 100° F. and 100% relative humidity, 3 hours at a temperature of −40° F., 2 hours at 160° F., and 3 hours immersion in a 5% sodium chloride solution at room temperature, all in immediate succession and for a period of at least 10 days. After such exposure this coating will not crack or deteriorate and can be readily stripped from the surface, leaving the protected part free of corrosion (AN-C-117).

While I have hereinabove discussed primarily the applicability of the composition comprised of compatible mixtures of celulose acetate butyrate and chlorinated terphenyls suitably plasticized, in hot melt coating of objects, my discovery of the compatibility of the chlorinated terphenyls with cellulose acetate butyrate having a butyryl value in excess of 38% makes possible also the casting of films of cellulose acetate butyrate carrying chlorinated terphenyls which are clear and which are not brittle. I may therefore obtain films having the advantage of toughness, elasticity, lack of brittleness, transparency, freedom from blush, water and weather resistance, and non-inflammability, and other advantages cited above by casting the films from solutions of the mixture of the above cellulose acetate butyrate-chlorinated terphenyl mixture, suitably plasticized as desired. Such films are produced as described above.

While I have described a particular embodiment of my invention for the purpose of illustration, it should be understood that various modifications and adaptations thereof may be made within the spirit of the invention as set forth in the appended claims.

I claim:

1. A composition having a melting point between 150° F. and 450° F. and comprising a chlorinated terphenyl having a melting point between 150° F. and 450° F. and cellulose acetate butyrate having a butyryl value in excess of 38%, the ratio of the cellulose acetate butyrate to the chlorinated terphenyl being within the range of from substantially 6 to substantially ⅓ part of said cellulose acetate butyrate to one part of said chlorinated terphenyl, and a plasticizer.

2. A composition, comprising a chlorinated terphenyl having a melting point in excess of 150° F. and below 450° F. and cellulose acetate butyrate having a butyryl value in excess of 38%, the ratio of the cellulose acetate butyrate to the chlorinated terphenyl in said composition being within the range of from substantially 6 to substantially ⅓ part of said cellulose acetate butyrate to 1 part of said chlorinated terphenyl, and a plasticizer.

3. A composition, comprising a chlorinated terphenyl having a melting point not greater than 450° F. and in excess of 150° F. and a cellulose acetate butyrate resin having a butyryl value in excess of 38% and a plasticizer said composition having a melting point between 150° F. and 450° F., said composition containing from 10% to 60% of said chlorinated terphenyl and from 20% to 60% of said cellulose acetate butyrate said composition melting below 450° F. to form a fully fluid melt.

4. A composition comprising a chlorinated terphenyl and cellulose acetate butyrate having a butyryl value in excess of 38% and a plasticizer, the melting point of the composition being between 150° F. and 450° F. and the softening point of said composition being from about 30° F. to 75° F. below its melting point, composition containing 10% to 60% of said chlorinated terphenyl and 20% to 60% of said cellulose acetate butyrate.

5. A composition, comprising a chlorinated terphenyl having a melting point between 150° F. and 450° F. and cellulose acetate butyrate having a butyryl value in excess of 49%, the ratio of the cellulose acetate butyrate to the chlorinated terphenyl being from substantially 6 to substantially ⅓ part of said cellulose acetate butyrate to 1 part of said chlorinated terphenyl, and a plasticizer.

6. A composition having a melting point between 150° and 450° F., comprising a chlorinated terphenyl and a cellulose acetate butyrate having a butyryl value in excess of 49% and a plasticizer, said composition containing from 10% to 60% of said chlorinated terphenyl and from 20% to 60% of said cellulose acetate butyrate.

7. A composition comprising a chlorinated terphenyl and cellulose acetate butyrate having a butyryl value in excess of substantially 49% and a plasticizer, the melting point of said composition being in excess of about 150° F. and not in excess of about 450° F., the composition having a softening point from about 30° to 75° F. lower than said melting point and forming clear films on congelation, said composition containing from 10% to 60% of said chlorinated terphenyl and from 20% to 60% of said cellulose acetate butyrate.

8. A composition comprising a chlorinated terphenyl and cellulose acetate-butyrate having a butyryl value in excess of 38% and a plasticizer, and said chlorinated terphenyl being present in percentages ranging from 10 to 50% by weight, said cellulose acetate-butyrate being present in percentages ranging from 20 to 60% by weight, and said plasticizer being present in percentages ranging from 10 to 50% by weight, said composition having a melting point from 150° F. to 450° F., and having a softening point which is from 30 to 75° F. lower than said melting point.

9. A composition comprising a chlorinated terphenyl and cellulose acetate-butyrate having a butyryl value in excess of substantially 49% and a plasticizer compatible with said cellulose acetate-butyrate resin, and said chlorinated terphenyl being present in percentages ranging from 10 to 50% by weight, said cellulose acetate-butyrate being present in percentages ranging from 20 to 60% by weight, and said plasticizer being present in percentages ranging from 10 to 50% by weight, said composition having a melting point between 150° F. and 450° F., and having a softening point which is from 30 to 75° F. lower than said melting point.

10. A composition comprising a chlorinated terphenyl and cellulose acetate-butyrate having a butyryl value of substantially 49% or more and a plasticizer, and said chlorinated terphenyl being present in percentages ranging from 10 to 50% by weight, said cellulose acetate-butyrate being present in percentages ranging from 20 to 60% by weight, and said plasticizer being present in percentages ranging from 10 to 50% by weight, said composition having a melting point between 150° F. and 450° F. and having a softening point which is from 30 to 75° F. lower than said melting point.

11. A composition comprising a nono-chlorterphenyl and cellulose acetate-butyrate and a plasticizer having a butyryl value of substantially 49% or more, and said nono-chlorterphenyl being present in percentages ranging from 10 to 50% by weight, said cellulose acetate-butyrate being present in percentages ranging from 20 to 60% by weight, and said plasticizer being present in percentages ranging from 10 to 50% by weight, said composition having a melting point between 150° F. and 450° F., and having a softening point which is from 30 to 75° F. lower than said melting point.

12. A composition comprising a chlorinated terphenyl and cellulose acetate-butyrate resin having a butyryl value in excess of 38% and a plasticizer, said chlorinated terphenyl being present in percentages ranging from 10 to 50% by weight, said cellulose acetate-butyrate being present in percentages ranging from 20 to 60% by weight, and said plasticizer being present in percentages ranging from 10 to 50% by weight, said composition having a melting point of 230° F. to 350° F. and having a softening point which is from 30 to 75° F. lower than said melting point.

13. A composition comprising a nono-chlorterphenyl and cellulose acetate-butyrate having a butyryl value of substantially 49% or more and a plasticizer said nono-chlorterphenyl being present in percentages ranging from 10 to 50% by weight, said cellulose acetate-butyrate being present in percentages ranging from 20 to 60% by weight, and said plasticizer being present in percentages ranging from 10 to 50% by weight, said composition having a melting point of 230° to 350° F. and having a softening point which is from 30 to 75° F. lower than said melting point.

ROBERT ERNST.

REFERENCES CITED

The following references are of record in the file of this patent:

UNITED STATES PATENTS

| Number | Name | Date |
| --- | --- | --- |
| 1,942,926 | Jenkins | Jan. 9, 1934 |
| 2,085,816 | Meigs | July 6, 1937 |
| 2,245,499 | Reichel | June 10, 1941 |
| 2,261,140 | Conklin et al. | Nov. 4, 1941 |
| 2,300,168 | Olsen | Oct. 27, 1942 |
| 2,343,658 | Gearhart | Mar. 7, 1944 |
| 2,387,773 | Salo et al. | Oct. 30, 1945 |

Certificate of Correction

Patent No. 2,486,012                                          October 25, 1949

ROBERT ERNST

It is hereby certified that errors appear in the printed specification of the above numbered patent requiring correction as follows:

Column 10, line 44, strike out the word "resin"; lines 45, 46, and 47, strike out "said composition having a melting point between 150° F. and 450° F."; lines 50 and 51, strike out "melting below 450° F. to form a fully fluid melt." and insert instead *having a melting point between 150° F. and 450° F.*; column 11, lines 30 and 31, strike out "compatible with said cellulose acetatebutyrate resin"; column 12, lines 2 and 3, strike out "and a plasticizer" and insert the same after "more" and before the comma in line 4; line 15, strike out "resin";

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*